(12) United States Patent
Wang et al.

(10) Patent No.: US 11,566,390 B2
(45) Date of Patent: Jan. 31, 2023

(54) CONSTRUCTION METHOD OF RECLAIMING LAND FROM THE SEA BASED ON BASEMENT UTILIZATION

(71) Applicant: Wenhou University, Wenzhou (CN)

(72) Inventors: Jun Wang, Wenzhou (CN); Yuanqiang Cai, Wenzhou (CN); Linzhu Sun, Wenzhou (CN); Peng Wang, Wenzhou (CN); Chuan Gu, Wenzhou (CN); Lin Guo, Wenzhou (CN); Hongtao Fu, Wenzhou (CN); Shihu Gao, Wenzhou (CN); Quanyang Dong, Wenzhou (CN); Qi Sun, Wenzhou (CN); Guohui Yuan, Wenzhou (CN); Junfeng Ni, Wenzhou (CN); Ziyang Gao, Wenzhou (CN)

(73) Assignee: Wenhou University, Wenzhou (CN)

( * ) Notice: Subject to any disclaimer, the term of this patent is extended or adjusted under 35 U.S.C. 154(b) by 286 days.

(21) Appl. No.: 16/835,334

(22) Filed: Mar. 31, 2020

(65) Prior Publication Data

US 2020/0318306 A1 Oct. 8, 2020

(51) Int. Cl.
*E02B 3/18* (2006.01)
*E04B 1/70* (2006.01)
*E02D 29/09* (2006.01)

(52) U.S. Cl.
CPC ............... *E02B 3/18* (2013.01); *E02D 29/06* (2013.01); *E04B 1/7023* (2013.01)

(58) Field of Classification Search
CPC ........ E02B 3/18; E02B 17/0017; E02D 29/06; E02D 27/04; E04B 1/70
See application file for complete search history.

(56) References Cited

U.S. PATENT DOCUMENTS

| | | | | |
|---|---|---|---|---|
| 1,638,656 A | * | 8/1927 | Chenoweth | E02B 3/10 405/107 |
| 4,583,882 A | * | 4/1986 | Szabo | E02D 29/06 264/298 |
| 5,803,659 A | * | 9/1998 | Chattey | E02D 23/02 405/8 |
| 6,520,720 B1 | * | 2/2003 | Boldurev | B63B 35/44 405/195.1 |
| 2001/0028825 A1 | * | 10/2001 | Kinno | E02B 3/04 405/76 |

(Continued)

FOREIGN PATENT DOCUMENTS

CN 107268536 A * 10/2017

*Primary Examiner* — Benjamin F Fiorello

(57) ABSTRACT

A construction method of reclaiming land from the sea based on the basement utilization, which implementation steps are as follows: a. installing a dike along the coastline, enclosing a central reclamation area by the dike and the coastline; b. installing crisscross enclosures in the central reclamation area, dividing the central reclamation area into a mesh area by the enclosure and the dike; c, pumping drainage of seawater in a block area in the mesh area, forming land in the block area; d. constructing the enclosure in the mesh reclamation area, using the enclosure and subsidiary roads to form road arteriality; the block area being lower than the height of the enclosure, constituting a grid-like high-road/low-land land supply mode; e. developing the block area into an underground space area.

17 Claims, 8 Drawing Sheets

(56) References Cited

U.S. PATENT DOCUMENTS

2007/0068859 A1* 3/2007 Cheramie ................ B09B 1/00
　　　　　　　　　　　　　　　　　　210/170.01
2014/0227032 A1* 8/2014 Hoshino ................... E02B 3/18
　　　　　　　　　　　　　　　　　　　　405/21
2017/0306579 A1* 10/2017 Salis ....................... B63B 35/38

* cited by examiner

CONSTRUCTION METHOD OF RECLAIMING LAND FROM THE SEA BASED ON BASEMENT UTILIZATION

BACKGROUND OF THE INVENTION

1. Field of the Invention

The present invention relates generally to a construction method of reclaiming land from the sea, and more particularly to a construction method of reclaiming land from the sea based on basement utilization.

2. Description of Related Art

The mode of traditional reclaiming land mainly requires backfilling of mineral deposits and rock and soil. Because rock and soil backfilling needs to blast mountains to take stones, it will destroy the natural ecological environment. The method of natural impelling siltation is difficult to meet the rapid demand of reclaiming land from the sea in a short time due to the long impelling siltation time. Although the method of hydraulic fill plus vacuum preload ng drainage consolidation resolves the issue of a large amount of mineral deposits required for backfilling, it needs to blow mud from the open sea. So, it destroys the marine ecological environment, and the settlement of the dredger soil formed is larger in the later stage and needs a longer time, which adversely affects the foundation engineering of the building.

SUMMARY OF THE INVENTION

In view of the shortcomings of the existing technology, the technical issue to be resolved by the present invention is to provide a construction method of reclaiming land from the sea based on the basement utilization. This construction method does not require hydraulic fill, which not only greatly reduces the cost but also constructs the underground space area at the same time, thus alleviating the lack of urban land resources and conducive to the sustainable development of the city, which is a new development mode of reclaiming land from the sea.

The present invention adopts the following technique scheme and is a construction method of reclaiming land from the sea based on the basement utilization. The implementation steps are as follows:

a. installing a dike along the coastline, enclosing a central reclamation area by the dike and the coastline;

b. installing crisscross enclosures in the central reclamation area, dividing the central reclamation area into a mesh area by the enclosure and the dike;

c. pumping drainage of seawater in a block area in the mesh area, forming land in the block area;

d. constructing the enclosure in the mesh reclamation area, using the enclosure and subsidiary roads to form road arteriality; the block area being lower than the height of the enclosure, constituting a grid-like high-road/low-land land supply mode;

e. developing the block area into an underground space area.

In the present invention, the block area in the mesh area is subject to sea water pumping drainage to allow the block area to form land. Buildings are built on the block area, and the bottom part is used as an underground space area, which does not require hydraulic fill, thereby not only greatly reducing the cost but also constructing underground space area at the same time, thus alleviating the lack of urban land resources and conducive to the sustainable development of the city, which is a new development mode of reclaiming land from the sea.

DETAILED DESCRIPTION OF THE INVENTION

With reference to the embodiments of the accompanying drawings, details and working principles are described in detail in the following.

Figure 1:
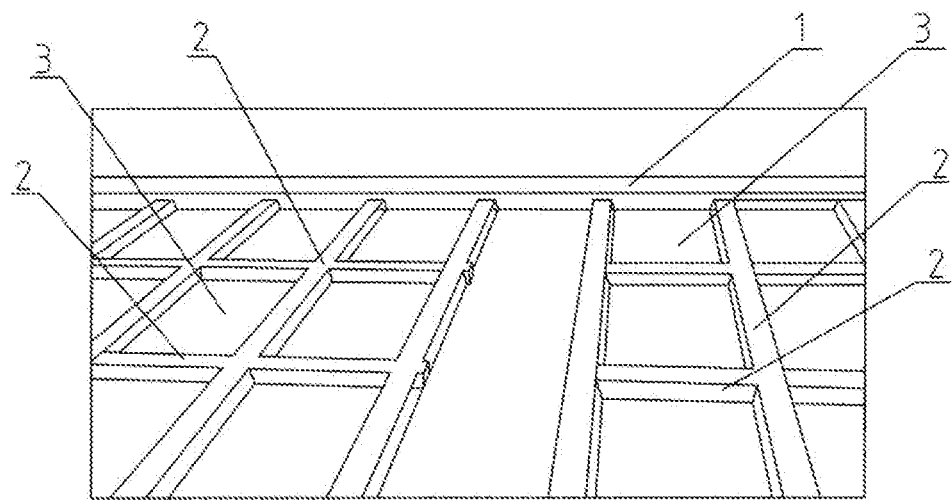
FIG. 1 is a structural diagram of the mesh area built by the construction method of reclaiming land from the sea based on the basement utilization.
Figure 2:
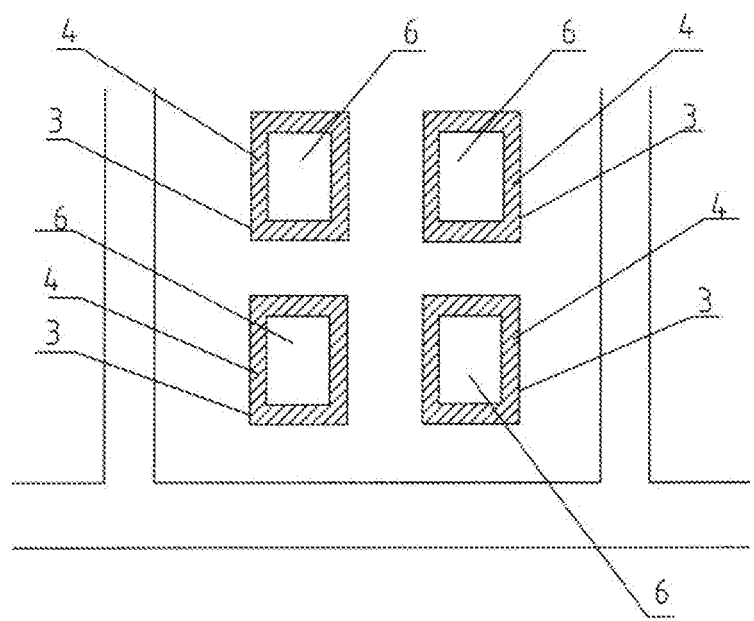
FIG. 2 is a first mode of basement space of the mesh area shown in FIG. 1.
Figure 3:
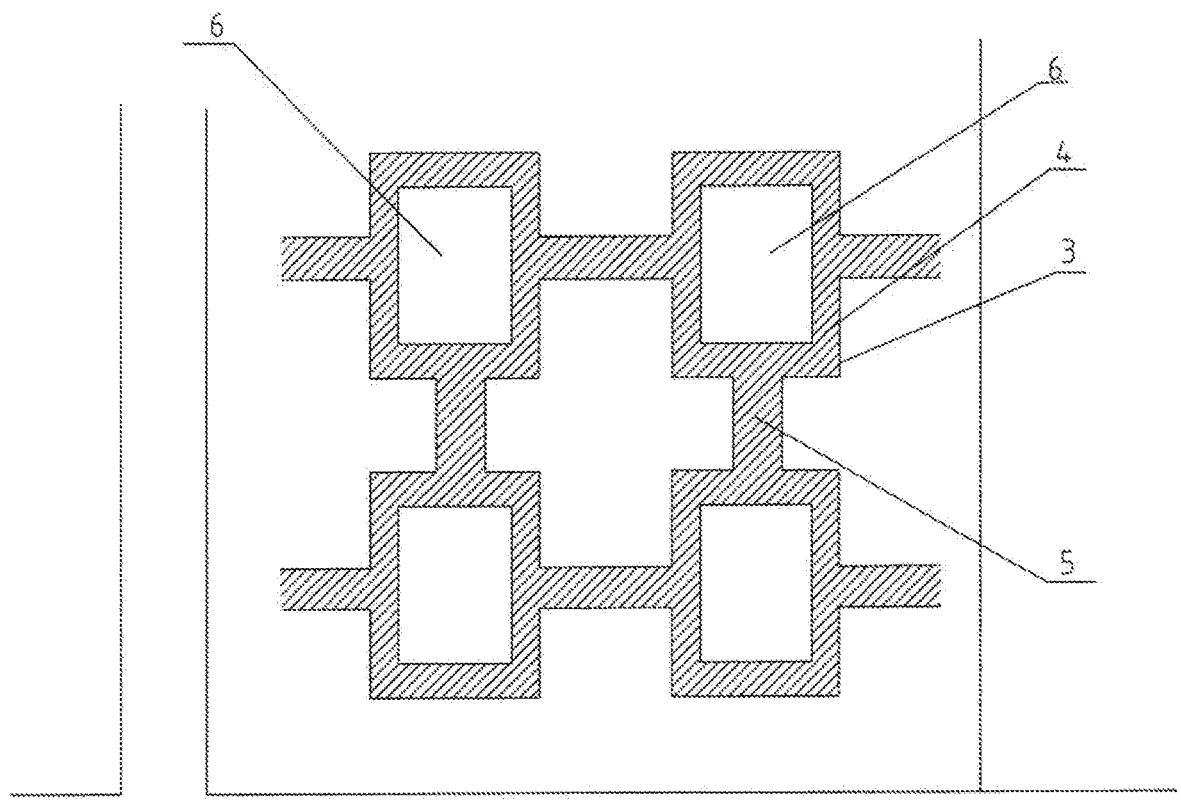
FIG. 3 is a second mode of basement space of the mesh area shown in FIG. 1.
Figure 4:
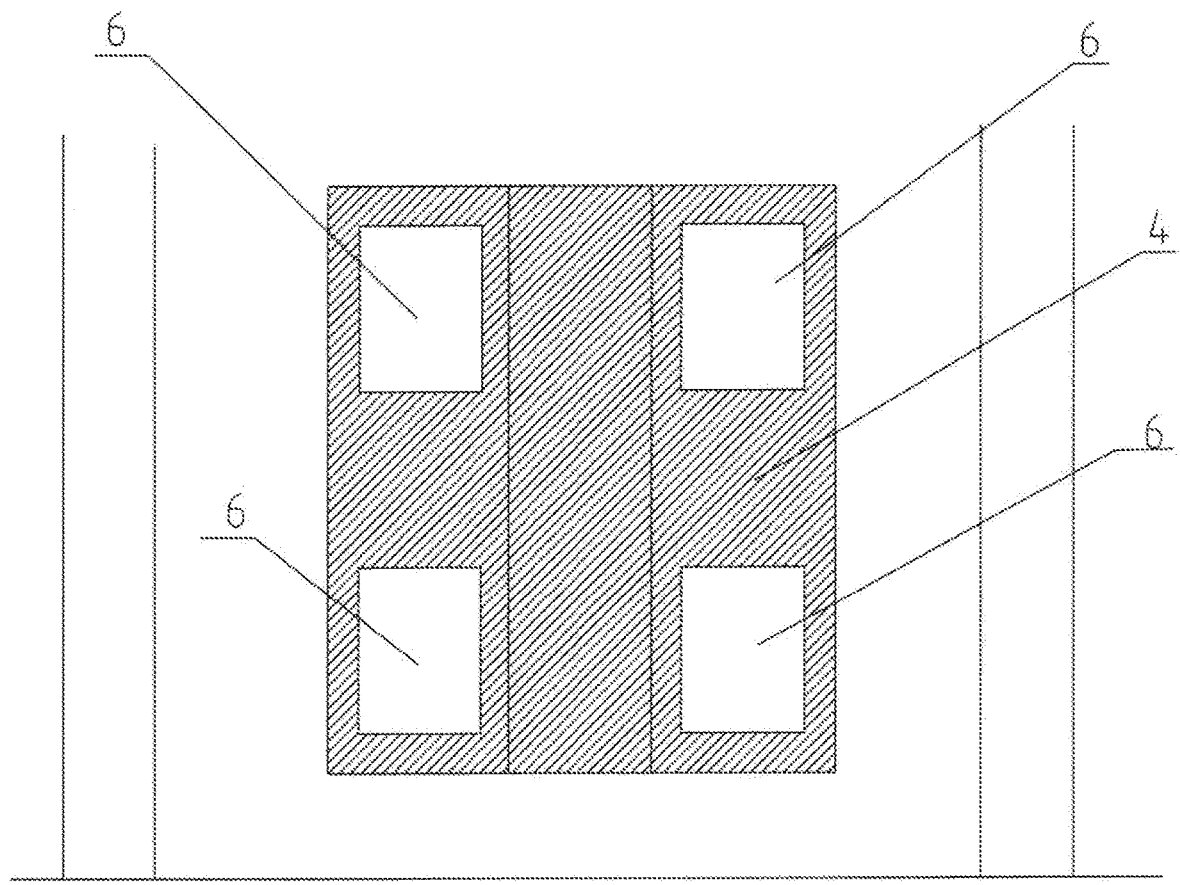
FIG. 4 is a third mode of basement space of the mesh area shown in FIG. 1.
Figure 5:
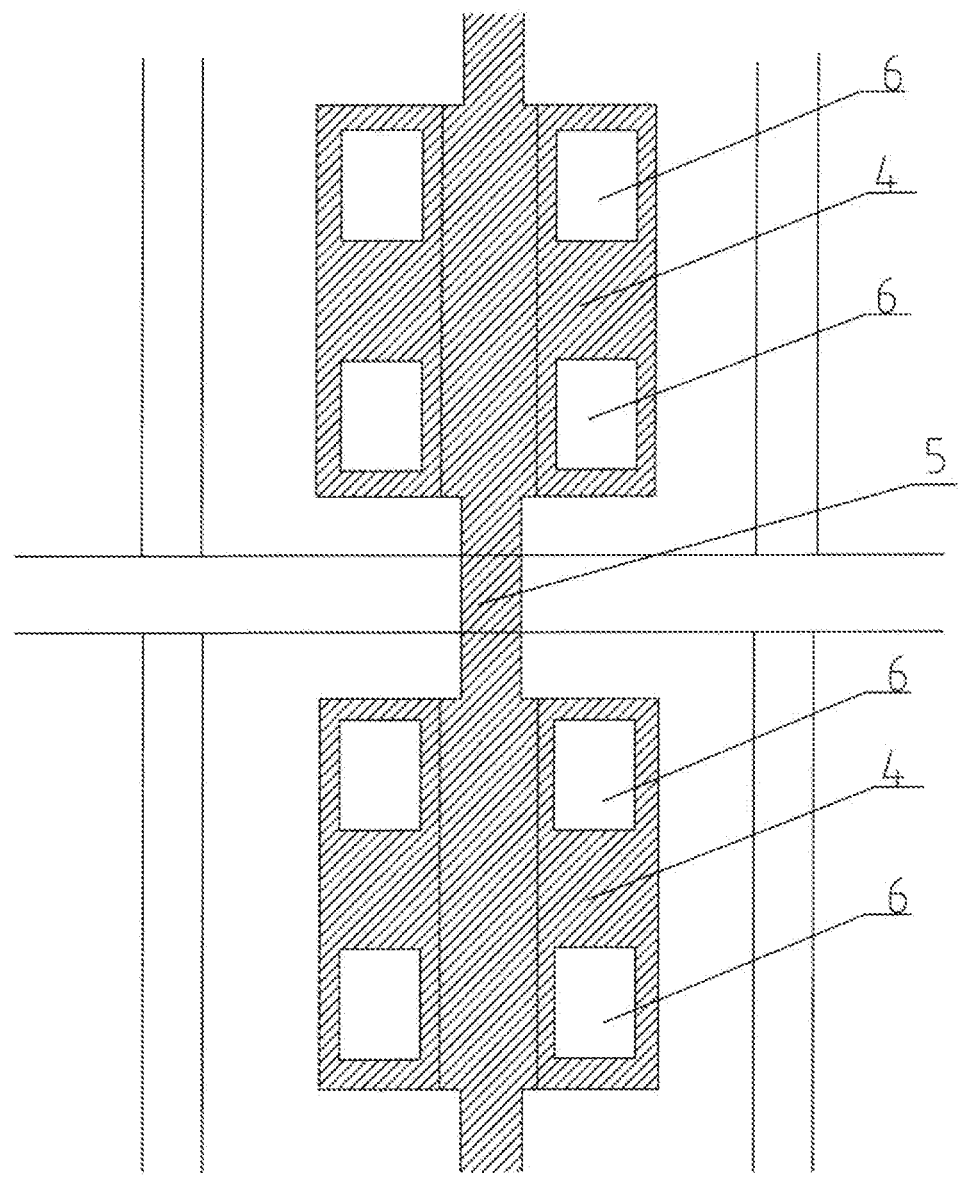
FIG. 5 is a fourth mode of basement space of the mesh area shown in FIG. 1.

Referring to FIG. 1, the present invention provides a construction method of reclaiming, land from the sea based on the basement utilization, which implementation steps are as follows:

a. installing a dike 1 along the coastline, installing several rows of piles in the dike 1, enclosing a central reclamation area by the dike 1 and the coastline;

b. installing crisscross enclosures 2 in the central reclamation area, dividing the central reclamation area into a mesh area by the enclosure 2 and the dike, installing several rows of piles in the enclosure 2;

c. pumping drainage of seawater in a block area 3 in the mesh area, forming land in the block area;

d. constructing the enclosure 2 in the mesh reclamation area, using the enclosure and subsidiary roads to form road arteriality, the block area 3 being lower than the height of the enclosure 2, constituting a grid-like high-road/low-land land supply mode;

e. developing the block area into an underground space area.

Referring to FIG. 2 to 5, each block area is built with an independent building 6. The bottom part of the block area is a basement space. The basement space can be designed into four development modes, and independent building 6 is built on the block area. The first mode of basement space is to use basement space 4 at the bottom part of the block area as an independent basement, the adjacent block areas are not connected, and the basement is independently used; the second mode of basement space is to reserve a passage 5 in adjacent block areas, independent building 6 is built on each block area, and the basement spaces 4 at the bottom part of the block area are connected through the reserved passage 5; the third mode of basement space is that the basement spaces 4 of multiple adjacent block areas are connected to each other, independent building 6 is built on each block area, and the basement spaces 4 of multiple adjacent block areas form an integrated composite underground space, constituting a building complex; the fourth mode of basement space is that the composite underground spaces of the adjacent building complex are connected through the reserved passages and the building complexes in different areas are connected through the continuous underground space 4. The continuous underground space 4 can be located under the urban roads and comprehensively arranged in combination with urban municipal administration and traffic facilities.

Figure 6:
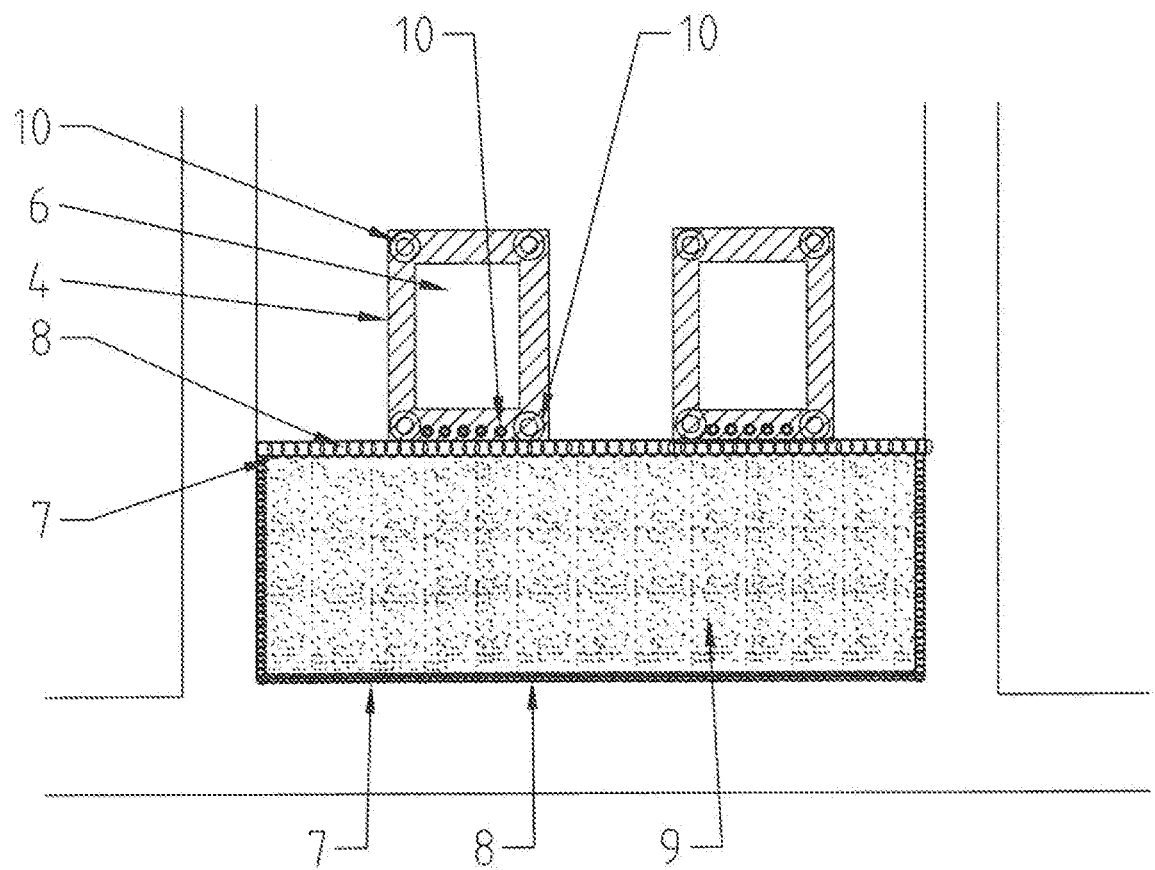
FIG. 6 is a fifth mode of basement space of the mesh area shown in FIG. 1.

Referring to and FIG. 1 and FIG. 6, in order to further diversify and functionalize the use of land and effectively use construction waste and dredged sludge the green space and building area are planned in the block area 3 surrounded by the enclosure 2. Cement-soil mixing pile 7 is constructed around the green space to form a gravity wall. The upper end of the gravity wall is a retaining wall 8 formed by pouring concrete, and the area forming the green space is surrounded by the gravity wall to form an operation pit 9. The thickness of the gravity wall adjacent to the building area is formed by the large-diameter cement-soil mixing pile 7, forming an outside gravity wall, and the thickness of the gravity wall adjacent to the enclosure 2 area is formed by the small-diameter cement-soil mixing pile 7, forming an inside gravity wall. The diameter of the small-diameter cement-soil mixing pile is 300-500 mm and the diameter of the large-diameter cement-soil mixing pile is 800-1200 mm. In this embodiment, small-diameter cement-soil mixing pile with diameter of 450 mm and large-diameter cement-soil mixing pile with diameter of 1000 mm are selected. The operation pit 9 is filled with dredged sludge, harmless construction waste and sand, wherein the dredged sludge can provide nutrients for green plants and is buried in a sand drain. A sealing cloth is laid over the filling material in the operation pit 9. The sand drain is connected to a pump drainage system at the upper end to pump out the water in the operation pit through a vacuum preloading. If the basement of the building area is more than two floors, pipe piles 10 are constructed at the outer side of the outside gravity wall for support.

Figure 7:
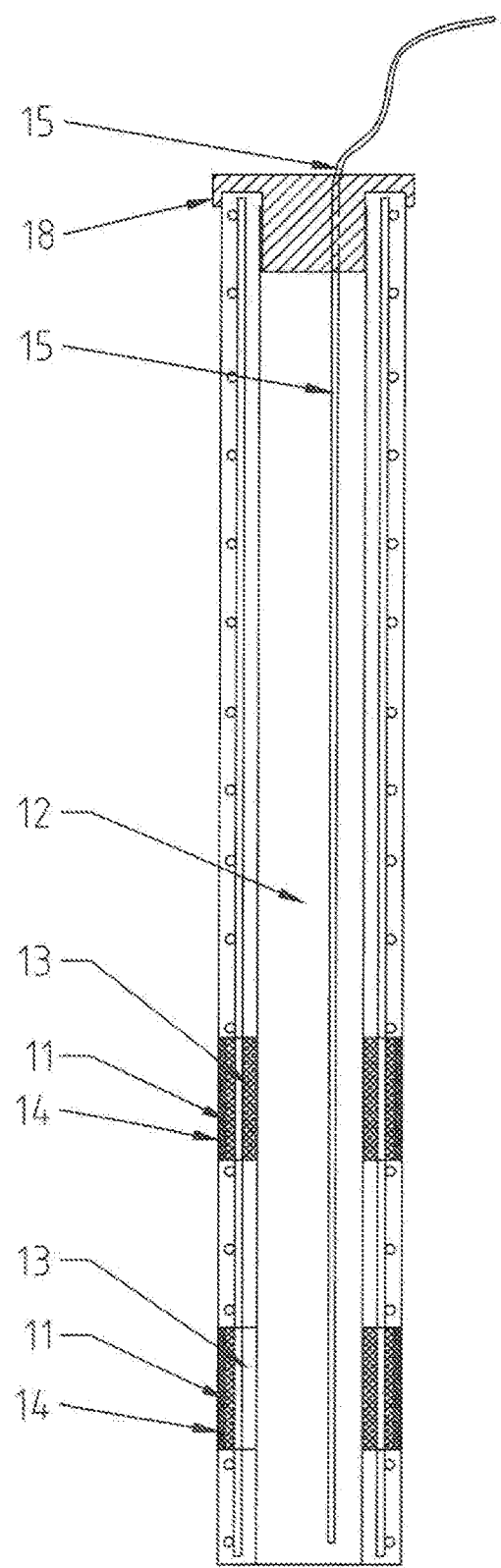
FIG. 7 is a cross-sectional view of the pipe pile, where a hose is inserted in the internal through hole of the pipe pile.
Figure 8:
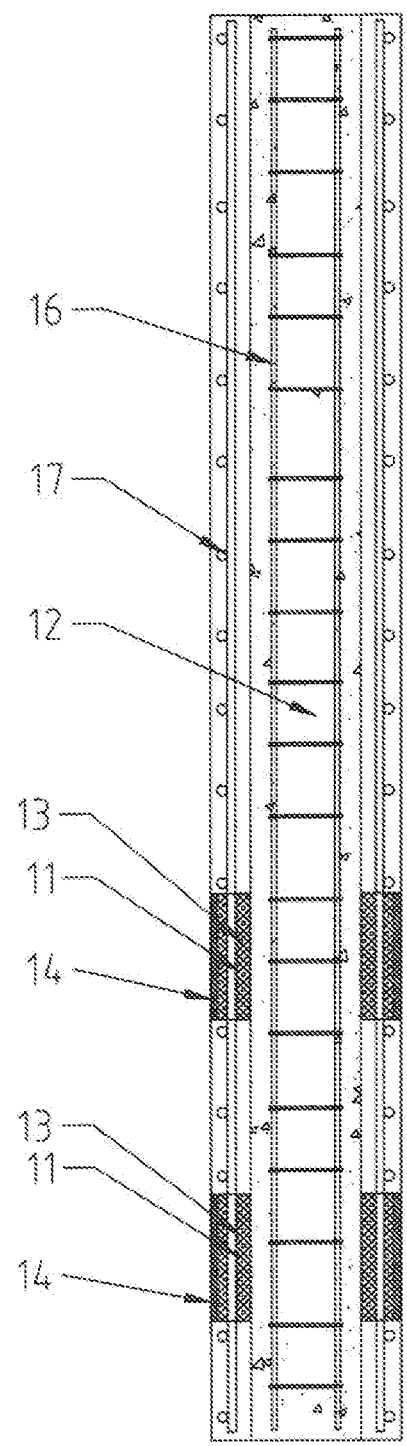
FIG. 8 is the cross-sectional view of the pipe pile, where a reinforcing cage is hoisted into the pipe pile and concrete is poured to form an engineering pile.

Referring to FIG. 7 and FIG. 8, in order to further strengthen the structure of the basement and the foundation and at the same time carry out drainage under the premise of cost saving, pipe piles 10 are constructed in the construction area planned for the building land. An annular water-permeable area 11 is provided on the side wall of the pipe pile 10, and the pipe pile 10 is provided with a short column connected up and down in the annular water-permeable area 11. The pipe pile 10 is provided with an internal through hole 12. The annular water-permeable area 11 is covered with a steel wire mesh 13, and the outer side of the steel wire mesh is covered with a filter cloth 14. A drainage pipe is laid in the construction area, and a sealing cloth is laid on the upper surface of the soil in the construction area. The drainage pipe is connected to a nose 15 that penetrates into the internal through hole 12 of the pipe pie 10. The upper end of the pipe pile is sealed with a plug 18, and the hose 15 passes through the plug 18 and enters the internal through hole 12. The upper end of the drainage pipe is connected to the vacuum equipment through the sealing cloth, and the vacuum equipment is used to perform vacuum preloading drainage. When vacuum pumping is completed, the sealing cloth is removed; conduit pipe and the hose 15 are drained; a reinforcing cage 16 is hoisted into the pipe pile 10 and concrete is poured to form an engineering pile. The pipe pile 10 is made of reinforced concrete, and the pipe wall of the pipe pile 10 is installed with a banded ring-shaped reinforcing cage 17. The upper part of the pipe pile 10 in the area where the basement is designed as the supporting column and the side wall is reserved, and the height of the reserved part is adapted to the design height of the basement. In constructing the basement space, the pipe pile 10 is inserted into the reinforcing cage 16 and poured with concrete and modified into a basement supporting column, forming a portion of the basement.

In the present invention, the block area 3 in the mesh area is subject to sea water pumping drainage to allow the block area 3 to form land. Buildings are built on the block area 3, and the bottom part is used as an underground space area which does not require hydraulic fill, thereby not only greatly reducing the cost but also constructing underground space area at the same time. Construction of the basement not only avoids or reduces the excavation and support, but also is the best way to make full use of the elevation for best utilization of the basement space, which is conducive to the realization of sustainable development of the city and is a new development mode of reclaiming land from the sea.

We claim:

1. A construction method of reclaiming land from the sea based on the basement utilization, comprising the steps of:
    installing a dike along the coastline, enclosing a central reclamation area by the dike and the coastline; the central reclamation area having crisscross enclosures;
    install dividing the central reclamation area into a block area by the enclosure and the dike;
    pumping drainage of seawater in a block area in the block area, forming land in the block area;
    using enclosure and subsidiary roads to form road arteriality; the block area being lower than the height of the enclosure, constituting a grid-like high-road/low-land land supply mode;
    developing the block area into an underground space area;
    wherein a green space and building area are planned in the block area surrounded by the enclosure; cement-soil mixing pile is constructed around the green space to form a gravity wall; the upper end of the gravity wall is a retaining wall formed by pouring concrete, and the area forming the green space is surrounded by the gravity wall to form an operation pit; the thickness of the gravity wall adjacent to the building area is formed by a large-diameter cement-soil mixing pile, forming an outside gravity wall, and the thickness of the gravity wall adjacent to the enclosure area is formed by a small-diameter cement-soil mixing pile, forming an inside gravity wall; the diameter of the small-diameter cement-soil mixing pile is 300-500 mm, and the diameter of the large-diameter cement-soil mixing pile is 800-1200 mm; the operation pit is filled with dredged sludge, construction waste and sand, wherein the dredged sludge can provide nutrients for green plants and is buried in a sand drain; a sealing cloth is laid over the filling material in the operation pit; the sand drain is connected to a pump drainage system at the upper end to pump out the water in the operation pit through a vacuum preloading.

2. The construction method of reclaiming land from the sea based on the basement utilization defined in claim 1, wherein several rows of piles are arranged in the dike and the enclosure.

3. The construction method of reclaiming land from the sea based on the basement utilization defined in claim 2, wherein the block area is built with an independent building and the bottom part of the block area is a basement space.

4. The construction method of reclaiming land from the sea based on the basement utilization defined in claim 2, wherein the adjacent block areas are reserved a passage;

independent building is built on each block area, and the basement spaces at the bottom part of the block area are connected through the reserved passage.

5. The construction method of reclaiming land from the sea based on the basement utilization defined in claim 2, wherein the basement spaces of multiple adjacent block areas are connected to each other, independent building is built on each block area, and the basement spaces of multiple adjacent block areas form an integrated composite underground space, constituting a building complex; the composite underground spaces of the adjacent building complex are connected through the reserved passage.

6. The construction method of reclaiming land from the sea based on the basement utilization defined in claim 2, wherein the green space and building area are planned in the block area surrounded by the enclosure; cement-soil mixing pile is constructed around the green space to form a gravity wall; the upper end of the gravity wall is a retaining wall formed by pouring concrete, and the area forming the green space is surrounded by the gravity wall to form an operation pit; the thickness of the gravity wall adjacent to the building area is formed by the large-diameter cement-soil mixing pile, forming an outside gravity wall, and the thickness of the gravity wall adjacent to the enclosure area is formed by the small-diameter cement-soil mixing pile, forming an inside gravity wall; the diameter of the small-diameter cement-soil mixing pile is 300-500 mm, and the diameter of the large-diameter cement-soil mixing pile is 800-1200 mm; the operation pit is filled with dredged sludge, construction waste and sand, wherein the dredged sludge can provide nutrients for green plants and is buried in a sand drain; a sealing cloth is laid over the filling material in the operation pit; the sand drain is connected to a pump drainage system at the upper end to pump out the water in the operation pit through a vacuum preloading.

7. The construction method of reclaiming land from the sea based on the basement utilization defined in claim 6, wherein if the basement of the building area is more than two floors, pipe piles are installed at the outer side of the outside gravity wall for support.

8. The construction method of reclaiming land from the sea based on the basement utilization defined in claim 7, wherein pipe piles are constructed in the construction area planned for the building land, and an annular water-permeable area is provided on the side wall of the pipe pile; the pipe pile is provided with an internal through hole, and the annular water-permeable area is covered with a steel wire mesh; a drainage pipe is laid in the construction area, and a sealing cloth is laid on the upper surface of the soil in the construction area; the drainage pipe is connected to a hose that penetrates into the internal through hole of the pipe pile; the upper end of the pipe pile is sealed with a plug, and the hose passes through the plug and enters the internal through hole; the upper end of the drainage pipe is connected to the vacuum equipment through the sealing cloth, and the vacuum equipment is used to perform vacuum preloading drainage; when vacuum pumping is completed, the sealing cloth is removed; conduit pipe and the hose are drained; a reinforcing cage is hoisted into the pipe pile and concrete is poured to form an engineering pile.

9. The construction method of reclaiming land from the sea based on the basement utilization defined in claim 8, wherein the pipe pile is made of reinforced concrete, and the pipe wall of the pipe pile is installed with a banded ring-shaped reinforcing cage.

10. The construction method of reclaiming land from the sea based on the basement utilization defined in claim 9, wherein the upper part of the pipe pile in the area where the basement is designed as the supporting column and the side wall is reserved, and the height of the reserved part is adapted to the design height of the basement; in constructing the basement space, the pipe pile is inserted into the reinforcing cage and poured with concrete and modified into a basement supporting column, forming a portion of the basement.

11. The construction method of reclaiming land from the sea based on the basement utilization defined in claim 1, wherein the block area is built with an independent building and the bottom part of the block area is a basement space.

12. The construction method of reclaiming land from the sea based on the basement utilization defined in claim 1, wherein adjacent block areas are reserved a passage; independent building is built on each block area, and basement spaces at the bottom part of the block area are connected through a reserved passage.

13. The construction method of reclaiming land from the sea based on the basement utilization defined in claim 1, wherein the basement spaces of multiple adjacent block areas are connected to each other; independent building is built on each block area, and the basement spaces of multiple adjacent block areas form an integrated composite underground space, constituting a building complex; the composite underground spaces of the adjacent building complex are connected through the reserved passage.

14. The construction method of reclaiming land from the sea based on the basement utilization defined in claim 1, wherein if the basement of the building area is more than two floors, pipe piles are installed at the outer side of the outside gravity wall for support.

15. The construction method of reclaiming land from the sea based on the basement utilization defined in claim 14, wherein pipe piles are constructed in the construction area planned for a building land, and an annular water-permeable area is provided on the side wall of the pipe pile; the pipe pile is provided with an internal through hole, and the annular water-permeable area is covered with a steel wire mesh; a drainage pipe is laid in the construction area, and a sealing cloth is laid on the upper surface of the soil in the construction area; the drainage pipe is connected to a hose that penetrates into the internal through hole of the pipe pile; the upper end of the pipe pile is sealed with a plug, and the hose passes through the plug and enters the internal through hole; the upper end of the drainage pipe is connected to the vacuum equipment through the sealing cloth, and the vacuum equipment is used to perform vacuum preloading drainage; when vacuum pumping is completed, the sealing cloth is removed; conduit pipe and the hose are drained; a reinforcing cage is hoisted into the pipe pile and concrete is poured to form an engineering pile.

16. The construction method of reclaiming land from the sea based on the basement utilization defined in claim 15, wherein the pipe pile is made of reinforced concrete, and the pipe wall of the pipe pile is installed with a banded ring-shaped reinforcing cage.

17. The construction method of reclaiming land from the sea based on the basement utilization defined in claim 16, wherein the upper part of the pipe pile in the area where the basement is designed as the supporting column and the side wall is reserved, and the height of a reserved part is adapted to the design height of the basement; in constructing the basement space, the pipe pile is inserted into the reinforcing cage and poured with concrete and modified into a basement supporting column, forming a portion of the basement.

* * * * *